G. M. EATON.
RESILIENT GEAR.
APPLICATION FILED FEB. 4, 1916.

1,284,269.

Patented Nov. 12, 1918.

WITNESSES:
Fred A. Lind
W. B. Wells

INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT GEAR.

1,284,269.  Specification of Letters Patent.  Patented Nov. 12, 1918.

Application filed February 4, 1916. Serial No. 76,163.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Gears, of which the following is a specification.

My invention relates to resilient gear wheels and particularly to gear wheels that are adapted to be interposed between the propelling motors and the driving wheels of electrically propelled vehicles.

One object of my invention is to provide a gear wheel of the above-indicated character which shall be composed of relatively few special parts and the internal mechanism of which shall be simple and easy to lubricate.

Another object of my invention is to provide a gear wheel of the above-indicated class having a hub member and a rim member and resilient cushioning means between the hub and the rim members which shall provide universal cushioning, through a limited range, between the two members relative to one another.

Figure 1:
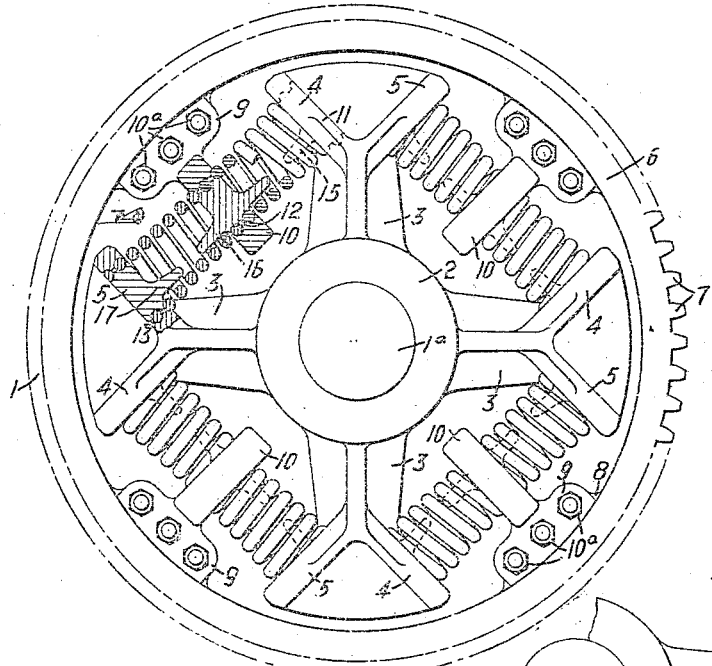
Figure 2:
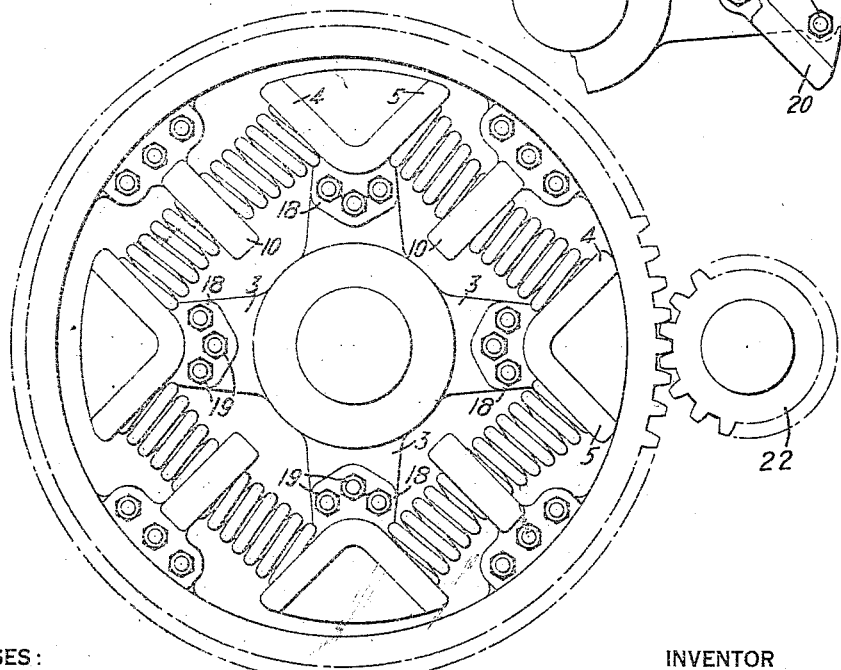

In the accompanying drawing illustrating my invention, Figure 1 is a side elevation of a resilient gear constructed in accordance with my invention; Fig. 2 is a side elevation of a modified gear wheel in the position it assumes when in service; and Fig. 3 is a detail view of another modified gear wheel.

Referring to Fig. 1, a resilient gear wheel 1, which is adapted to be mounted on a shaft 1ª, comprises a hub member 2, radial arms 3 and projections 4 and 5 extending from each arm 3. A rim member 6, which surrounds the hub member, is provided with gear teeth 7 and inwardly projecting lugs 8 which are disposed on the middle of the rim member 3. Spring-supporting members 9, which are provided with radial projections 10, are attached to the lugs 8 by means of bolts 10ª. The projections 4, 5 and 10 have openings 11, 12 and 13, respectively, which are provided with tapered screw-threads for a purpose to be described.

When the gear wheel is assembled, the projections are disposed in sets of three projections each composed of one projection 10 and of two projections 4 and 5. Each projection 10, as has been set forth, is radially disposed upon the rim member 6 and the projections 4 and 5 of each set are located in planes parallel to the projection 10 of the same set. The openings 11, 12 and 13 in the projections 4, 10 and 5 are alined with each other and the screws threads are tapered so that a frusto-conical spring 14 may be screwed through the three projections 4, 10 and 5. Plugs 15, 16 and 17 are screw-threaded in accordance with convolutions of the spring 14 and are tapered so that they may be screwed into the spring 14 and wedge the same against the screw threads in the respective projections 4, 10 and 5.

Figure 3:
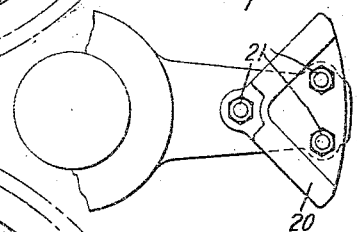

In the modified gears illustrated in Figs. 2 and 3, parts which are similar to the parts of the gear illustrated in Fig. 1 will be referred to by like reference characters.

In the modification illustrated in Fig. 2, the projections 4 and 5 are mounted upon spring supports 18 which are joined to the arms 3 by means of bolts 19. The arms 3 in this modification are shortened in order to reduce the weight of the gear.

In the modification illustrated in Fig. 3, the projections 4 and 5 are mounted on a spring support 20 by means of bolts 21. In this modification, the arms 3 extend beyond the spring support 20 so as to form a limit to prevent excessive displacement of the rim member 6. In a gear wheel constructed in accordance with my invention, the springs 14 will provide a limited universal cushioning means between the rim and hub members. Thus, in Fig. 2 the gear wheel is shown in engagement with a pinion 22 with the center of the rim member 6 displaced relative to the center of the hub member 2. The above-limited universal movement between the hub and rim members permits the teeth of the hub and rim members to mesh perfectly, permits the pinion 22 to have transverse play on its axle without disturbing the mesh of the gear teeth and eliminates back-lash.

It is evident that modifications in the specific structural details may be effected without departing from the spirit and scope of the invention and I desire, therefore, that only such limitations shall be imposed as are indicated in the appended claims.

I claim as my invention:

1. In a resilient driving mechanism, the combination with a hub member and a rim member, of means comprising springs secured to the hub and rim and having flexible parts intermediate said secured parts whereby said hub and rim may have universal movement relatively to each other.

2. In a resilient gear wheel, the combination with a hub member having radial arms, and a rim member mounted on the hub member and having inward projections, of springs screwed into said projections for resiliently joining said members and for supporting the rim member on the hub member.

3. In a resilient gear wheel, the combination with a hub member having radial arms, projections extending from said arms, and a rim member having inward projections, of helical springs screwed into said rim projections and the projections from said arms, each of said springs being associated with one rim projection and two hub projections, and means associated with each of said projections for wedging the associated spring in contact therewith.

4. In a resilient driving mechanism, the combination with a hub member having projections thereon, of a rim member having projections thereon extending into the spaces between the projections on the hub member, and springs secured to and connecting the projections on the hub and rim and having flexible portions intermediate said projections whereby said hub and rim may have a limited universal movement relatively to each other.

5. In a resilient gear wheel, the combination with a hub member, radial arms extending outwardly from said hub member, projections extending from said arms, a rim member mounted on said hub member, and projections extending inwardly from said rim member, of helical springs screwed through said rim projections and the projections from said hub arms for resiliently joining said hub and rim members and for supporting the rim member on the hub member.

6. In a resilient gear wheel, the combination with a hub member, radial arms extending outwardly from said hub member, a plurality of spring supports attached to said arms and each having two projections extending therefrom, a rim member having lugs projecting inwardly, and spring supports attached to said lugs and each having one radial projection extending radially therefrom, of helical springs for resiliently joining the projections mounted on the rim member to the projections mounted on the hub member.

7. In a resilient gear wheel, the combination with a hub member, a rim member mounted on the hub member, and a plurality of projections disposed in sets of three parallel projections each, each set having two projections joined to the hub member and one joined to the rim member, of a plurality of helical springs, the projections of each set being resiliently joined by one of said springs for supporting the rim member on the hub member and for resiliently joining said members.

8. In a resilient gear wheel, the combination with a hub member, a rim member surrounding said hub member, and a plurality of projections disposed in sets of three parallel projections each, each set having two projections joined to the hub member and one radial projection disposed between the first mentioned projections and joined to the rim member, of a plurality of helical springs for resiliently joining the projections attached to the rim member to the projections attached to the hub member.

9. In a resilient gear wheel, the combination with a hub member having radial arms extending outwardly therefrom, projections extending from said hub arms, and a rim member having radial projections extending inwardly therefrom, of frusto-conical helical springs for resiliently joining said rim projections with the projections on said hub arms, and retaining means for securing said springs to said projections, said retaining means for each projection embodying a screw-threaded opening to receive convolutions of its associated spring and a screw-threaded plug to wedge the convolutions of the spring against the threads through the projections.

10. In a resilient gear wheel, the combination with a hub member and a rim member of resilient means comprising helical springs secured to said members whereby the same may have a limited universal movement relative to each other.

11. In a resilient gear wheel, the combination with a hub member and a rim member surrounding said hub member, of means comprising springs having parts thereof secured to said hub member and to said rim member whereby the rim member and hub member may move laterally relatively to each other and rotate about different axes.

12. The combination with a resilient gear wheel comprising a hub member and a rim member provided with teeth around its periphery, and a pinion in mesh with the teeth of the resilient gear, of resilient means comprising springs secured to said rim member and to said hub member to permit the intermeshing teeth on said gear wheel and on said pinion to determine the alinement of the rim member relative to the pinion, and to permit the pinion to be moved in line with its axle relative to the hub member without interfering with meshing of the teeth on the gear wheel and the pinion.

13. The combination with a gear wheel having a hub member and a rim member provided with teeth around its periphery, and a pinion provided with teeth around its periphery and meshing with said gear wheel, of a plurality of projections extending from said hub and said rim members, and means comprising springs for joining said projections to cushion said gear wheel, said springs being secured to said projections on the hub and rim, whereby said hub and rim may move relatively to each other and said teeth may intermesh without clearance at the root of the same.

14. In a resilient gear wheel, the combination with a hub member having projections extending therefrom, and a rim member surrounding said hub member and provided with inwardly extending projections, of means comprising springs for joining said projections, said springs being rigidly attached to said projections and having intermediate flexible portions to permit the rim member and the hub member to rotate about different axes.

15. In a resilient gear wheel, the combination with a hub member having projections extending therefrom, and a rim member surrounding said hub member and provided with inwardly extending projections disposed between said hub projections, of resilient means having the intermediate portions thereof secured to the rim projections and the ends thereof secured to the adjacently disposed hub projections to permit the hub and rim members to effect a limited universal movement relative to each other.

In testimony whereof I have hereunto subscribed my name this 28th day of Jan., 1916.

GEORGE M. EATON.